US012044012B2

(12) United States Patent
Licciardello

(10) Patent No.: US 12,044,012 B2
(45) Date of Patent: Jul. 23, 2024

(54) POWER SPOUT DEVICE

(71) Applicant: Enrico Licciardello, Summerfield, FL (US)

(72) Inventor: Enrico Licciardello, Summerfield, FL (US)

( * ) Notice: Subject to any disclaimer, the term of this patent is extended or adjusted under 35 U.S.C. 154(b) by 68 days.

(21) Appl. No.: 17/592,157

(22) Filed: Feb. 3, 2022

(65) Prior Publication Data

US 2023/0243156 A1 Aug. 3, 2023

(51) Int. Cl.
*B05B 9/04* (2006.01)
*B05B 15/62* (2018.01)
*E04D 13/064* (2006.01)

(52) U.S. Cl.
CPC .......... *E04D 13/064* (2013.01); *B05B 9/0403* (2013.01); *B05B 15/62* (2018.02)

(58) Field of Classification Search
CPC ..... E04D 13/064; E04D 13/10; E04D 13/103; B05B 15/62; B05B 9/0403
USPC .......................................................... 239/208
See application file for complete search history.

(56) References Cited

U.S. PATENT DOCUMENTS 2,733,649 A * 2/1956 Barron .................. E04D 13/103 454/239
3,638,369 A * 2/1972 Albrecht ................. E04D 13/08 52/16
7,909,274 B2 * 3/2011 Migliaccio .......... E04D 13/0645 52/16
8,142,167 B2 * 3/2012 Vitale ........................ F04D 5/00 416/146 R
9,315,982 B2 * 4/2016 Weed ...................... E03F 5/101
2015/0110642 A1 * 4/2015 Dahouk .............. F04D 29/5806 417/16
2017/0268797 A1 * 9/2017 Mowris .............. G05D 23/1951

FOREIGN PATENT DOCUMENTS

JP 2014059094 * 4/2014 ................ F24F 7/08

OTHER PUBLICATIONS

Google English translation of JP2014059094. (Year: 2014).*

* cited by examiner

*Primary Examiner* — Chee-Chong Lee
(74) *Attorney, Agent, or Firm* — Jason T. Daniel, Esq.; Daniel Law Offices, P.A.

(57) ABSTRACT

A power spout device includes a generally hollow main body having an outlet opening and an inlet opening for engaging the downspout outlet of a horizontal gutter. An elongated paddle is positioned within the main body and is mechanically connected to an electric motor. A fluid sensor is also positioned within the main body and is electrically connected to the motor. The fluid sensor functioning to selectively operate the motor upon detecting the presence of rainwater from the downspout outlet. A controller having a wireless communication unit is positioned along the main body. The controller functioning to receive operating instructions from a remote-control device. An adjustable nozzle is positioned along the output opening to adjust the vertical angle of the water being discharged out of the outlet opening.

17 Claims, 5 Drawing Sheets

POWER SPOUT DEVICE

TECHNICAL FIELD

The present invention relates generally to roof drainage and gutter systems, and more particularly to a power spout device that eliminates or reduces the need for conventional downspouts on commercial or residential buildings.

BACKGROUND

The statements in this section merely provide background information related to the present disclosure and may not constitute prior art.

Many building roofs are equipped with a rainwater gutter system for directing the flow of rainwater from the roof onto the ground in a controlled manner. In most instances, these systems include a series of generally horizontal gutters which are open along their top ends. Each of the horizontal gutters are designed to be placed along the edge of the building roof and are slightly angled to direct collected rainwater to one end where a vertical downspout is located.

The vertical downspout is typically an enclosed channel having an opening along the top end which engages a downspout outlet that extends through the bottom of the horizontal gutter. Rainwater flows along the gutter, through the outlet and into the downspout where it is ultimately dispensed by a second opening along the bottom end of the downspout. In most residential applications, the bottom end of the downspout is angled away from the building, so as to position the second opening approximately 8-10 inches from the building wall.

Although generally useful, there are several practical issues associated with the use and operation of downspouts in rainwater gutter systems. For example, aside from detracting from the aesthetics of a building, it is not uncommon for downspouts to become clogged with debris such as leaves, roofing material, sticks, and other such objects. As the debris collects in the downspout, water accumulates and backs up into the horizontal gutter where it can overflow onto the building itself, thus causing potential damage to the roof structure. Moreover, the weight of the water can cause damage to the gutter and/or the downspout itself, which can cause sagging or cause the items to become disconnected from the roof.

Additionally, although the bottom ends of the downspouts are typically directed away from the building, the flow of water leaving the spout often causes serious soil erosion along the base of the building's foundation. Likewise, it is extremely common for the distal ends of the downspouts to become damaged by lawn maintenance personnel and/or to become a haven for rodents who often crawl inside the opening. Although there are known accessories for attempting to reduce these issues such as trench drains, splash pads and the like, these items are not able to eliminate all of the issues described above.

Accordingly, it would be beneficial to provide a power spout device which can be used with a gutter system to remove rainwater from a horizontal gutter without the use of a downspout, thus eliminating the issues described above.

SUMMARY OF THE INVENTION

The present invention is directed to a power spout device. One embodiment of the present invention can include a generally hollow main body having an inlet opening along the top surface and an outlet opening along the front surface.

The inlet opening can include a shape and a size that is suitable for receiving and engaging the downspout outlet of a horizontal gutter.

In one embodiment, an elongated paddle can be positioned within the main body and can be mechanically connected to an electric motor. Additionally, a fluid sensor can be positioned within the main body and can be electrically connected to the motor. The fluid sensor can function to detect the presence of rainwater received from the downspout outlet and selectively operate the motor to rotate the paddle to dispense the received rainwater out through the outlet opening.

In one embodiment, the device can include a controller having a wireless communication unit. The wireless communication unit can include functionality for communicating with a remote-control device such as a smartphone device running a mobile application. The mobile application can include instructions for permitting a user to remotely operate the power spout device.

In one embodiment, a nozzle can be positioned along the output opening. The nozzle can include a servomotor that is connected to a moveable vane which functions to adjust a vertical angle of the water being discharged out of the outlet opening. In one embodiment, the servomotor can be connected to the controller to permit a user to control the movement of the vane by the remote-control device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
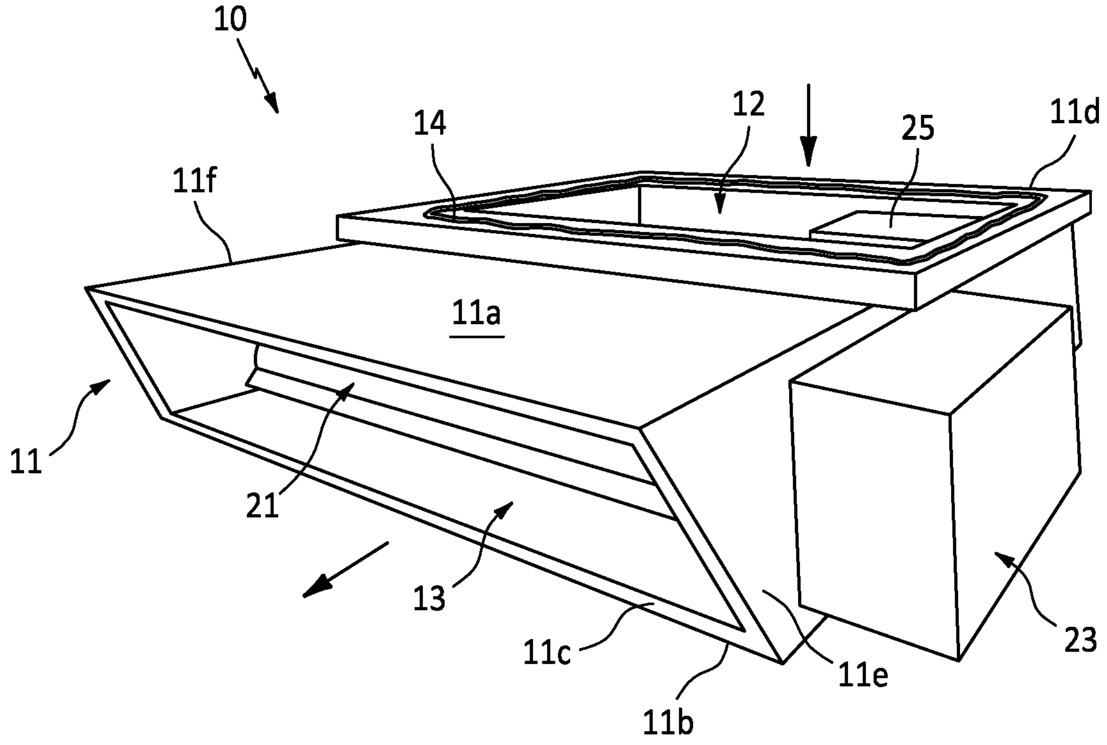
FIG. 1 is a perspective view of a power spout device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include, but are not limited to, opposing strips of hook and loop material (i.e., Velcro®), attractively oriented magnetic elements, a thin, flexible strap with a notched surface and one end threaded through a locking mechanism (i.e., zip tie) at the other, tethers, buckles such as side release buckles, and compression fittings, among many others, for example. Each connector can be permanently secured to the illustrated portion of the device via a permanent sealer such as glue, or welds, for example.

FIGS. 1-5 illustrate one embodiment of a power spout device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown at FIG. 1, one embodiment of the power spout device 10 can include a main body 11 having a top end 11*a*, a bottom end 11*b*, a front end 11*c*, a back end 11*d* and a pair of sides 11*e* and 11*f* that define a generally hollow interior space. As described herein, the main body 11 may be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.). Of course, any number of other materials are also contemplated.

In one embodiment, an inlet opening 12 can be positioned along the top end of the main body, and an outlet opening 13 can be positioned along the front end of the main body. Each of the inlet and outlet openings can be connected to the hollow interior space of the main body and can function to create a pathway through which rainwater can travel.

Figure 5:
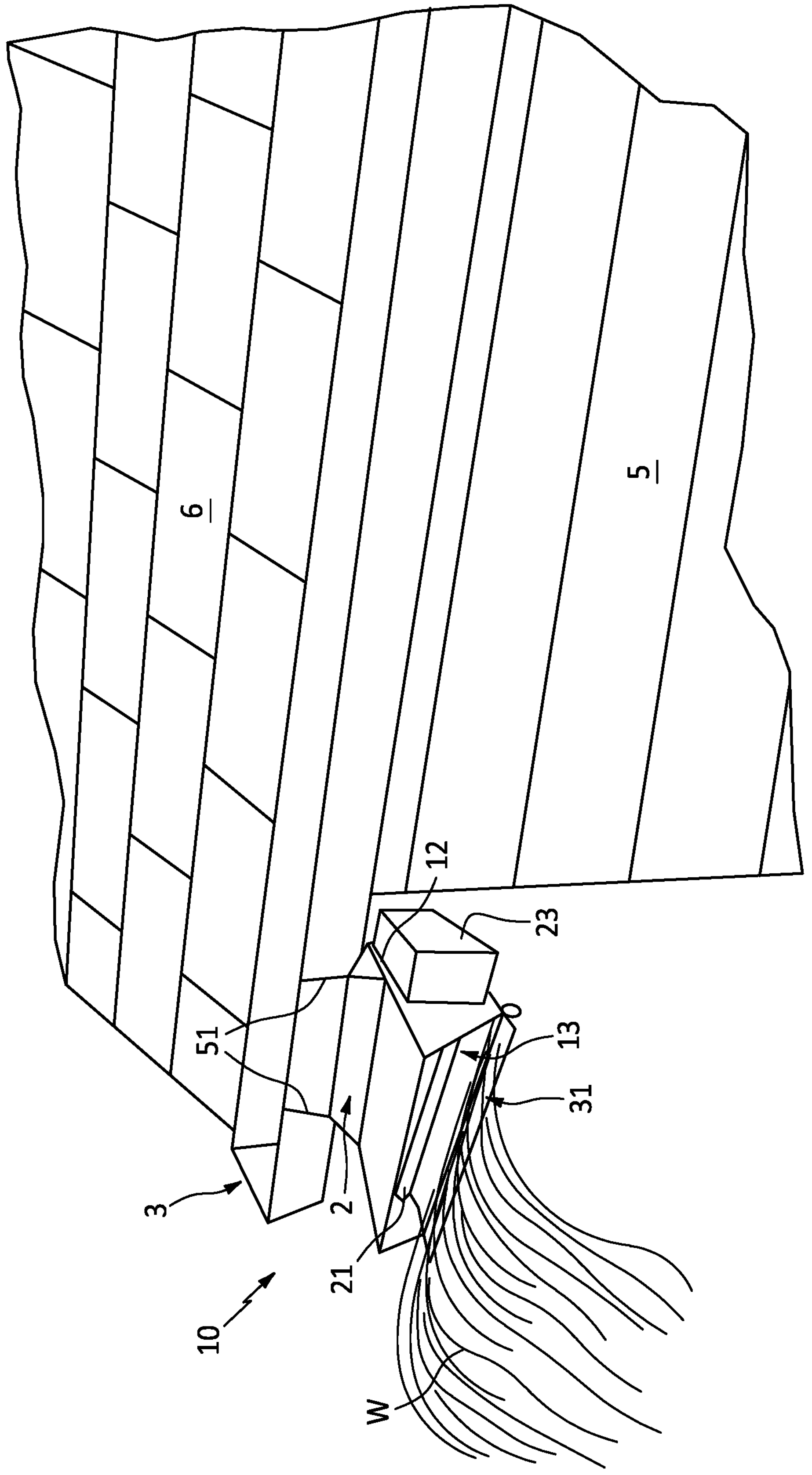
FIG. 5 is a perspective view of the power spout device in operation, in accordance with one embodiment of the invention.

In one embodiment, the inlet opening 12 can function to receive and engage the bottom end of a downspout outlet that extends through the bottom end of a horizontal gutter trough (See FIG. 5). As such, in the preferred embodiment, the opening 12 can include a shape and an inside dimension that is complementary to the shape and the outside dimension of the bottom end of a commercially available downspout outlet. To this end, different versions of the device 10 can be manufactured to include inlet openings having different shapes and sizes so as to be used with a wide variety of gutter outlet devices.

In one embodiment, a watertight seal 14 can be disposed along the top end of the main body 11*a* at a location adjacent to the opening 12. The seal can be constructed from rubber, silicone or other such materials and can function to engage the bottom surface of the horizontal gutter when the downspout outlet is positioned within the opening 12.

Although described above as including a particular shape, size or location of components, this is for illustrative purposes only. To this end, the main body 11 and/or the inlet opening 12 can include any number of different shapes and sizes. Additionally, other embodiments are contemplated wherein the inlet opening 12 and/or outlet opening 13 are located along different surfaces of the main body so as to permit the device 10 to engage gutter systems in different orientations than illustrated.

Moreover, in one embodiment the device 10 can include or can be used with an inlet adaptor such as a hollow sleeve, for example, which can be connected to the downspout outlet along of a horizontal gutter along a first end, and the inlet opening 12 along a second end. Such a feature allowing a single power spout device to be utilized with gutter systems having downspout outlets of varying sizes whereby only the shape or size of the first end of the sleeve need be different.

Of course, other embodiments are contemplated wherein the main body 11 is secured onto a horizontal gutter so as to position the inlet opening 12 directly beneath an aperture along the bottom or side of the horizontal gutter, so as to receive rainwater directly from the gutter without the use of a downspout outlet.

Figure 2:
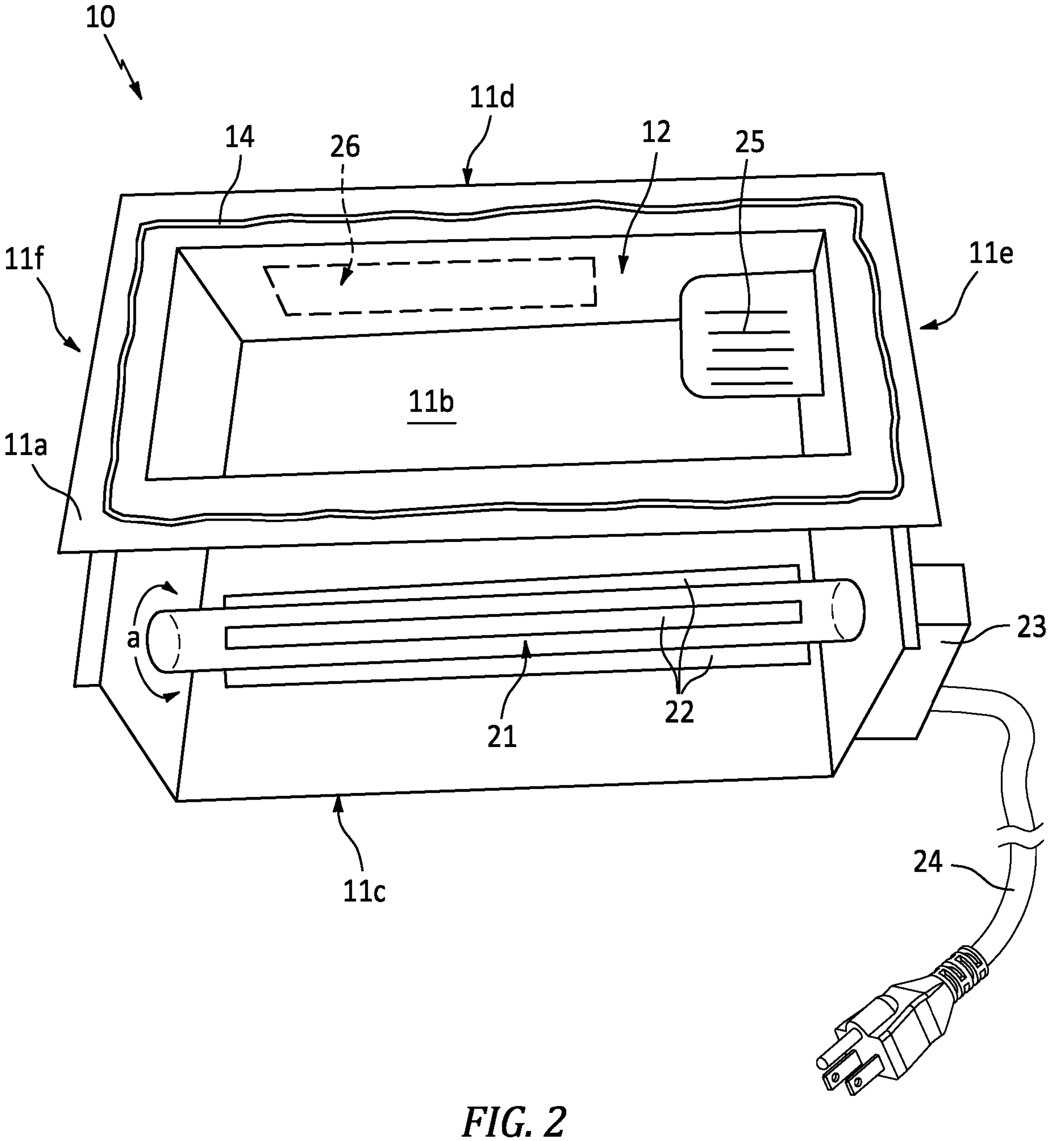
FIG. 2 is a top perspective view of the power spout device in accordance with one embodiment of the invention.

As shown best at FIG. 2, where a portion of the main body is removed for ease of illustration, an elongated paddle 21 can be positioned within the inside of the main body. In the illustrated embodiment, the paddle 21 can include an elongated, generally cylindrical-shaped member having a plurality of vanes 22 along the exterior surface. As shown by arrow a, the paddle can be rotatably connected to the main body via mounting pins or other such hardware that permit rotational movement of the paddle.

In one embodiment, the paddle can be connected to an electric motor 23 which can function to selectively rotate the paddle to actively remove rainwater from the main body. As described herein, the motor 23 can include any type of electric motor capable of imparting a rotational force onto the paddle in the manner described herein and can be a direct current or alternating current-style motor having a power cord and/or electrical transformer 24 for connecting to a power source. One suitable example of a motor 23 for use herein can include the model DF45L024048 DC motor that is commercially available from Nanotec®, for example, however, any number of other motors are also contemplated.

Although described above with regard to a single paddle and motor combination for actively removing water from the main body, this is for illustrative purposes only. To this end, those of skill in the art will recognize that many other types of fluid discharge systems and components may be provided for actively discharging the water without undue experimentation. For example, other embodiments are contemplated wherein a plurality of different paddles or fluid dispensing motors may be used in conjunction with or in place of the illustrated paddle 21. Additionally, the device 10 may also include an onboard battery 26 and/or solar cells for providing power to the motor and other electronic components of the device either as a primary power source or as a backup power source.

In one embodiment, a fluid sensor 25 can be provided to detect the presence of water within the interior space of the main body. The sensor can be positioned anywhere within the main body and can be connected to the motor 23. Upon detecting the presence of liquid such as rainwater inside the main body, the sensor can send an electronic signal to the motor 23 and/or the below described controller 40 in order to selectively activate the motor.

As described herein, the fluid sensor can include any number of components capable of detecting the presence of a liquid within a specified area. Several nonlimiting examples can include, but are not limited to electronic liquid detection sensors, moisture detection sensors, electronic float switch sensors and mechanical float switch sensors, among others, for example. In various embodiments, the device can function to immediately activate the motor 23 upon the sensor detecting water or can be programmed to activate the motor upon detecting water in a predetermined amount (e.g., weight of water on the sensor, or height of standing water within the main body, for example).

Figure 3:
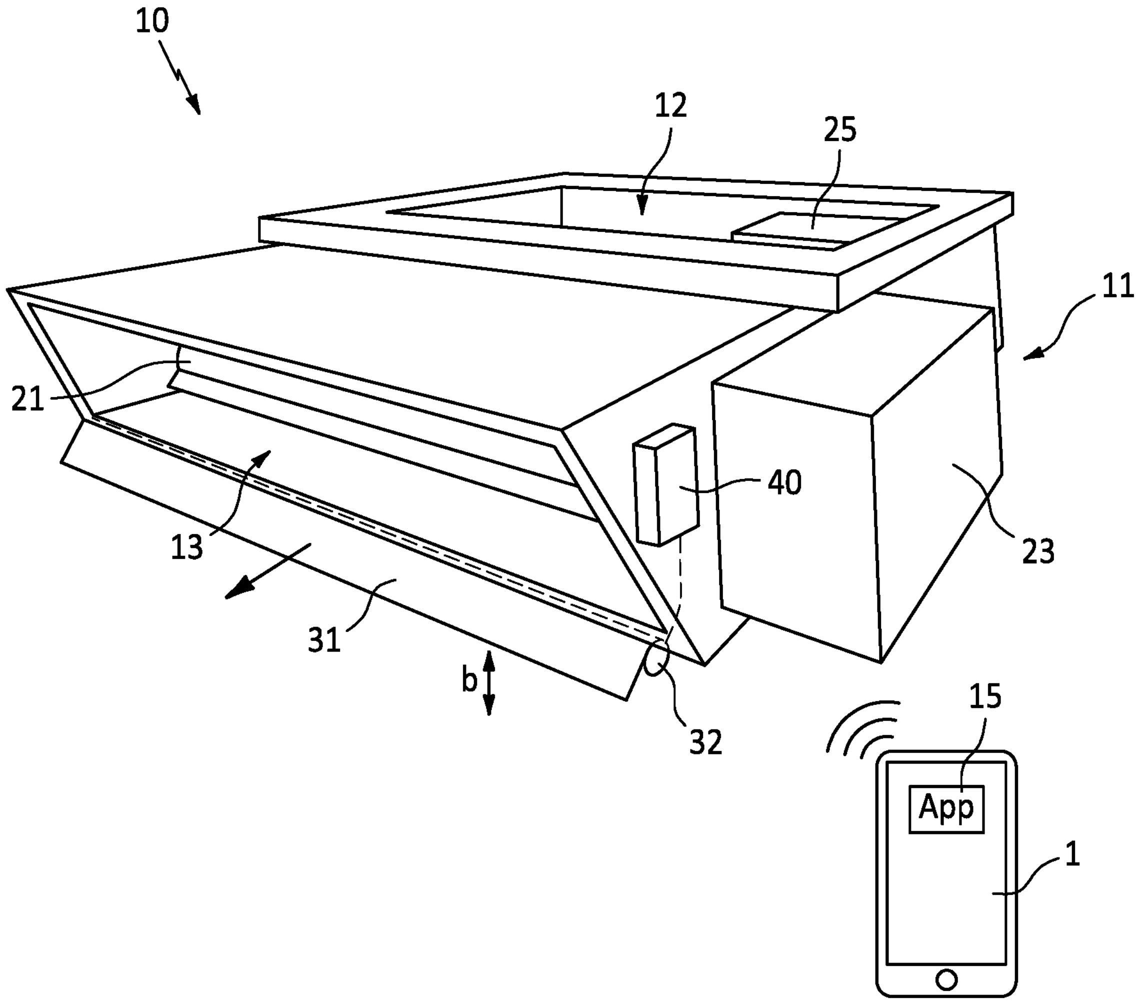
FIG. 3 is another perspective view of the power spout device in accordance with one embodiment of the invention

As shown at FIG. 3, one embodiment of the device 10 can include an adjustable output nozzle 31 and a mobile application 15 for allowing remote operation of the device. In the illustrated embodiment, the adjustable nozzle 31 can include one or more vanes that are positioned along the outlet opening 13. As shown by arrow b, the nozzle can move relative to the main body in order to allow a user to adjust the vertical angle at which water exits the opening 13. This angle, combined with an increase or decrease in paddle spin rate allows a user to specify how far away from the building the water will land.

In one embodiment, the nozzle can be manual in nature, and can be adjusted at a time of initial installation onto the gutter system. In one embodiment, the nozzle can include a servomotor 32 so as to allow automatic or remote operation of the nozzle. As described herein, the servomotor can include any type of electronic device that is mechanically coupled to the nozzle 31 in order to physically move the nozzle in one or both of a horizontal or vertical direction. Several nonlimiting examples of suitable servomotors include, but are not limited to a rotational style motor, a linear actuator style motor or other such components which are well known in the art.

In one embodiment, the device 10 can also include a controller 40 for controlling an operation of the device components, and for allowing a user to remotely operate the power spout via a smartphone 1 or other type of processor device that is running a mobile application 15.

Figure 4:
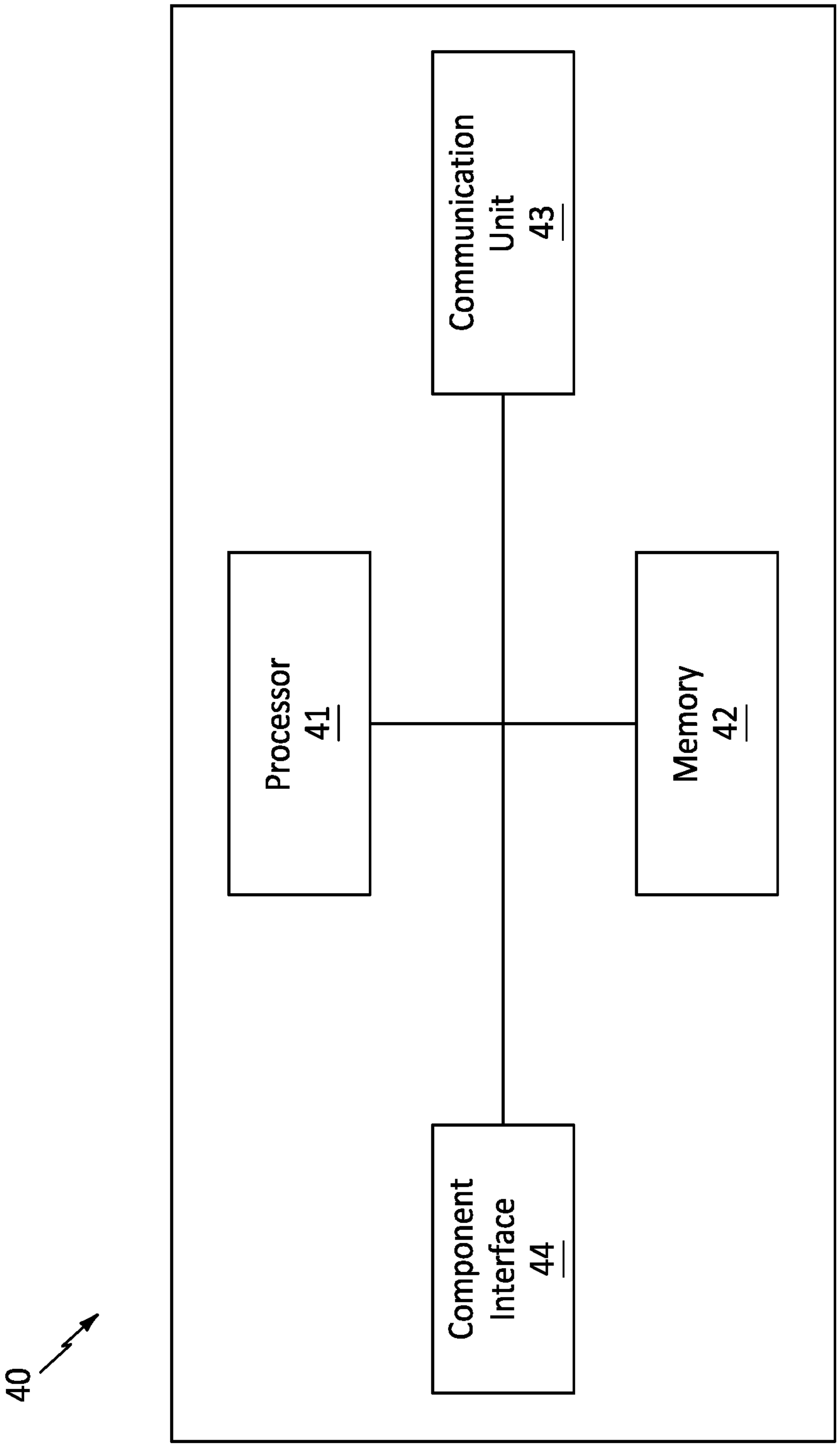
FIG. 4 is a simplified block diagram of the internal controller of the power spout device in accordance with one embodiment of the invention.

As shown best at FIG. 4, one embodiment of the controller 40 can include a processor 41 that is conventionally connected to an internal memory 42, a communication unit 43, and a component interface unit 44.

Although illustrated as separate elements, those of skill in the art will recognize that one or more controller components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processor 41 can be a conventional central processing unit (CPU) or any other type of device, or multiple devices, capable of manipulating or processing information such as program code stored in the memory 42 and for causing the power spout device to function in the manner described herein.

Memory 42 can any type of physical memory devices such as solid-state memory, for example, capable of storing operating instructions in the form of program code for the processor 41 to execute.

The communication unit 43 can include any number of components capable of sending and/or receiving electronic signals with an externally located device, either directly or over a network. In one embodiment, the communication unit can include a Bluetooth transceiver for communicating wirelessly with the remote device 1 running a mobile application 15 that is encoded with instructions for communicating operating instructions with the Power spout device 10. Of course, any number of other known transmission protocols can be used such as a cellular transceiver, Wi-Fi transceiver or radio transceiver among others, for example.

Although described as including a mobile application for execution on a smartphone or other type of processor enabled device, this is for illustrative purposes only. To this end, the system can include a dedicated physical remote-control device having dedicated hardware for communicating only with the device 10.

The component interface unit 44 can function to provide a communicative link between the processor 41 and various other device components such as the motor 23, the fluid sensor 25, the servomotor 32, and the power source via the power cord 24 and/or onboard battery, for example. In this regard, the component interface unit can include any number of different components such as one or more PIC microcontrollers, internal bus, USB connections and other such hardware capable of providing a direct link between the various components. Of course, any other means for providing one or two-way communication between various system components can also be utilized herein.

FIG. 5 illustrates one embodiment of the power spout device 10 in operation. As shown, the bottom end of a drain outlet 2 extending from a horizontal gutter 3 can be positioned within the inlet opening 12 of the device. When so positioned, the above-described watertight seal can engage the bottom surface of the horizontal gutter to prevent leakage of rainwater passing through the system, and optional connectors 51 such as the illustrated clamps or hardware such as screws, for example, can be used to fasten the device to the gutter 3 and/or downspout 2.

As water enters the device from the gutter, the sensor can activate the motor 23 causing the paddle 21 to spin. This spinning motion results in the system actively expelling water W out of the outlet opening 13 and away from the building. As noted above, the direction and distance of the water leaving the system can be adjusted via the speed of the motor and direction of the nozzle 31.

Accordingly, the above-described power spout device 10 functions to actively remove water from a gutter system and can be used in conjunction with downspouts or as a replacement for the same. Moreover, because the water is forced out and away from the building 5 along the roofline 6, the water is disbursed across a much greater area of the ground and therefore does not result in erosion of soil along the building foundation.

For example, in one embodiment, the motor 23 can be configured to rotate the paddle 21 with a force sufficient to propel the water at least 5-10 feet horizontally away from the rooftop 6 of a single story building 5 when the device is positioned at a height of 12-15 feet from the ground. Of course, other settings and distances are contemplated.

As described herein, one or more elements of the power spout device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A power spout device, comprising:

a main body having a top surface, a front surface and an inside space;

an inlet opening that is positioned on the top surface of the main body, said inlet opening being configured to receive rainwater;

an outlet opening that is positioned along the main body, said outlet opening being configured to discharge the rainwater;

a paddle that is positioned within the inside space of the main body;

a motor that is connected to the paddle; and a fluid sensor that is positioned within the inside space of the main body, said fluid sensor being configured to detect the rainwater located within the inside space of the main body, wherein the inlet opening, and the outlet opening are in fluid communication with the paddle, and the motor is configured to selectively rotate the paddle to remove the detected rainwater within the inside space of the main body via the outlet opening;

wherein the outlet opening is positioned on the front surface of the main body.

2. The device of claim 1, wherein the motor is configured to be selectively activated upon receiving a signal from the fluid sensor.

3. The device of claim 1, wherein the fluid sensor comprises a liquid detection sensor.

4. The device of claim 1, wherein the motor comprises an alternating current motor.

5. The deice of claim 1, wherein the motor comprises a direct current motor.

6. The device of claim 1, further comprising:

a battery that is connected to the motor.

7. The device of claim 1, wherein the paddle comprises an elongated cylindrical member having a plurality of outward radiating vanes.

8. The device of claim 1, further comprising:

a controller that is in communication with the motor, said controller having a processor and a wireless communication unit.

9. The system of claim 8, further comprising:

an application for execution on a processor enabled device, said application including instructions for permitting the processor enabled device to communicate operating instructions with the wireless communication unit of the controller.

10. The system of claim 9, wherein the operating instructions include operation of the motor.

11. The system of claim 9, further comprising:

at least one adjustable vane that is located along the outlet opening; and a servomotor that is connected to the at least one vane, wherein the servomotor selectively moves the adjustable vane to change a direction of the rainwater being discharged from the outlet opening, and wherein said operating instructions includes an operation of the motor connected to the paddle, and an operation of the servomotor connected to the adjustable vane.

12. The system of claim 1, wherein the motor and paddle are configured to discharge the rainwater five to ten feet from the outlet opening.

13. The system of claim 1, wherein the outlet opening includes an adjustable orientation relative to an orientation of the main body, and is configured to discharge the rainwater in a plurality of user defined directions.

14. The system of claim 1, further comprising:

at least one adjustable vane that is located along the outlet opening; and a servomotor that is connected to the at least one vane, wherein the servomotor selectively moves the adjustable vane to change a direction of the rainwater being discharged from the outlet opening.

15. The system of claim 1, wherein the fluid sensor comprises:

a float switch sensor.

16. A power spout device, comprising:

a main body having a top surface, a front surface and an inside space;

an inlet opening that is positioned on the top surface of the main body, said inlet opening being configured to receive a fluid;

an outlet opening that is positioned along the main body, said outlet opening being configured to discharge a fluid;

a paddle that is positioned within the inside space of the main body;

a motor that is connected to the paddle; and a fluid sensor that is positioned within the inside space of the main body, said fluid sensor being configured to detect fluid located within the inside space of the main body, wherein the inlet opening, and the outlet opening are in fluid communication with the paddle, and the motor is configured to selectively rotate the paddle to remove the detected fluid within the inside space of the main body via the outlet opening;

wherein the inlet opening is configured to engage a downspout outlet located on a horizontal gutter system, and the fluid comprises rainwater received from the downspout outlet;

wherein the outlet opening is positioned on the front surface of the main body.

17. The system of claim 16, wherein the inlet opening is positioned on the top surface of the main body, and the inlet opening includes a shape and a size that is complementary to a shape and a size of the downspout outlet.

* * * * *